United States Patent [19]

Travis

[11] 3,830,119

[45] Aug. 20, 1974

[54] SHEAR-OFF OUTPUT SHAFT FOR TORQUE MULTIPLIER

[75] Inventor: Leo V. Travis, Aurora, Colo.

[73] Assignee: B. K. Sweeney Manufacturing Co., Denver, Colo.

[22] Filed: Aug. 8, 1973

[21] Appl. No.: 386,834

[52] U.S. Cl............................................. 81/52.4 R
[51] Int. Cl..................................................... B25b
[58] Field of Search.......... 81/52.4 R, 177 R; 403/2, 403/11

[56] References Cited
UNITED STATES PATENTS 3,331,267  7/1967  Tietge ............................ 81/52.4 R Primary Examiner—James L. Jones, Jr.
Attorney, Agent, or Firm—Burton, Crandell, Gary M. Polumbus & Harris

[57] ABSTRACT

An output shaft assembly for a torque multiplier is adapted to shear when a predetermined torque is applied thereto and includes a body portion having a defined shear location with a core rod rotatably received in the body portion but prevented from rotation by a removable pin so that when the body portion is sheared at the shear location into two axially aligned segments, the segments can be easily removed from the torque multiplier.

10 Claims, 6 Drawing Figures

PATENTED AUG 20 1974　　3,830,119
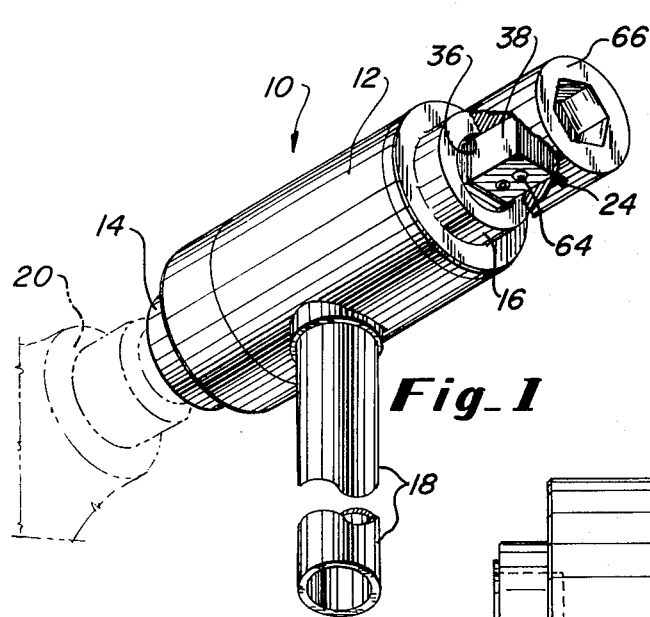
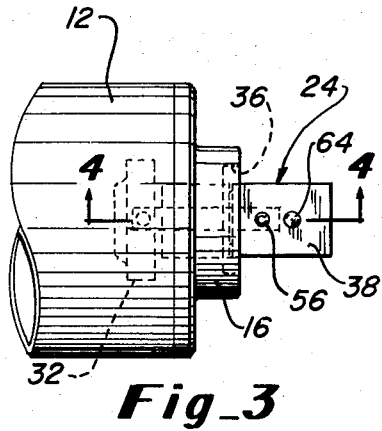
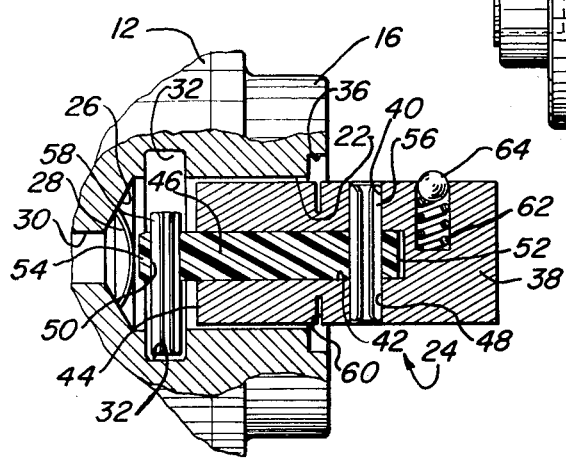
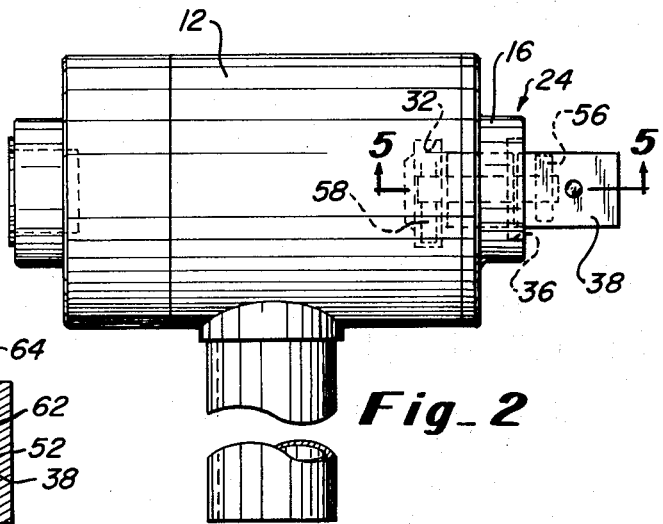
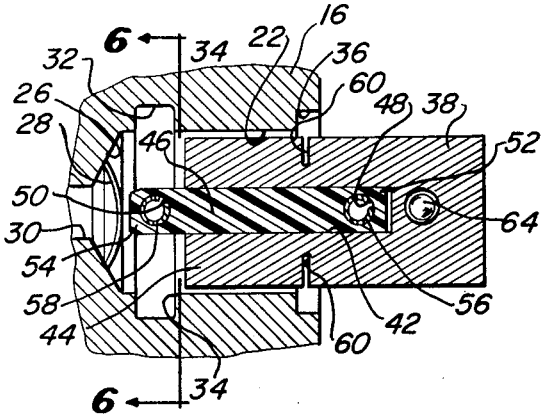
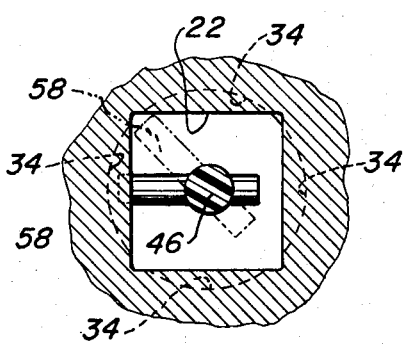

SHEAR-OFF OUTPUT SHAFT FOR TORQUE MULTIPLIER

The present invention is generally concerned with torque multipliers and more particularly with an output shaft assembly for a torque multiplier which will shear upon a predetermined torque loading.

Many rotary driving operations for tightening or loosening nuts, bolts, cap screws and oter parts requiring rotary force, are facilitated by the use of torque multipliers which multiply input torque through suitable gearing to obtain the desired output torque. Frequently, the output torque obtained from the torque multiplier is capable of damaging the gears in the multiplier if proper precautions are not taken. Also, the output torque will sometimes shear the output shaft and while output shafts are normally releasably retained in the torque multiplier, once they have been sheared they are difficult to remove particularly in double-reduction planetary torque multipliers where the central axis of the multiplier is not hollow and and the sheared stub of the output shaft cannot be forced out of its socket from internally of the multiplier.

Accordingly, it is an object of the present invention to provide an output shaft for a torque multiplier which is easily incorporated into and removed from the torque multiplier even after it has been sheared.

It is another object of the present invention to provide an output shaft for a torque multiplier which will shear upon a predetermined torque load to avoid damage to the internal components of the torque multiplier and which can be easily removed from the torque multiplier after it has sheared.

It is another object of the present invention to provide an output shaft assembly for a torque multiplier having a main body portion of square cross-section and a core rod rotatably received in an axial bore of the main body but prevented from rotation by one of a pair of roll pins extending transversely through the rod and the main body to attach the core pin to the main body for unitary rotation therewith while the other roll pin releasably retains the output shaft assembly in a socket in the torque multiplier in a manner such that the assembly is easily incorporated into or removed from the torque multiplier.

These and other objects of the present invention are obtained with an output shaft assembly that is simple in construction, will shear upon a predetermined torque load, and is designed to be quickly and easily incorporated into or removed from a conventional torque multiplier.

Conventional torque multipliers have a suitable gear train enclosed within a gear housing and are adapted to multiply the input torque applied at an input end thereof to obtain an output torque on a male output shaft at an output end sufficient to tighten or loosen nuts, bolts, cap screws and other parts requiring rotary force. The output end of a torque multiplier utilizing the output shaft of the present invention would have a socket of noncircular cross-section adapted to receive and mate with the output shaft of the invention for unitary rotation therewith and a recess in the wall of the socket spaced inwardly from the output end to define retention shoulders in the socket.

The output shaft assembly has a main body portion which conforms in external configuration with the configuration of the socket and has a cylindrical bore along its central longitudinal axis which opens through the trailing end of the body portion and is adapted to rotatably receive a cylindrical core rod. The core rod has a transverse passage through its leading end adapted to be aligned with a transverse passage through the body portion of the assembly so that an alignment pin or the like can be inserted through the aligned passages to retain the body on the core rod and prevent relative rotation therebetween. The trailing end of the core rod also has a transverse passage therethrough and an anchor pin or the like is tightly received in the passage so as to extend radially away from the core rod a distance sufficient to be retained beneath the retention shoulder in the socket wall. The core rod can be rotated, when the alignment pin is removed, to a position wherein the anchor pin does not underlie the shoulder allowing the entire assembly to be removed from the torque multiplier. The body portion of the output shaft assembly has a peripheral groove therein defining a shear plane of reduced cross-sectional size whereby when excessive torque is applied to the drive-shaft, the shaft will shear along the plane defined by the groove so as to separate the shaft into leading and trailing segments. The shear plane is positioned rearwardly of the alignment pin so that when the output shaft is sheared, the alignment pin can be removed allowing the severed leading end of the body portion of the shaft to be removed and the core rod rotated until the anchor pin is moved from beneath the shoulder allowing the remaining trailing segment of the drive shaft assembly to be removed.

Other objects, advantages and capabilities of the present invention will become more apparent as the description proceeds taken in conjunction with the accompanying drawings, in which:

FIG. 1 is a perspective view of a torque multiplier utilizing the shear-off output shaft of the present invention, FIG. 2 is an enlarged side elevation of the torque multiplier of FIG. 1, FIG. 3 is a fragmentary top plan view of the torque multiplier of FIG. 1, FIG. 4 is an enlarged fragmentary partial section taken along line 4—4 of FIG. 3, FIG. 5 is an enlarged fragmentary section taken along line 5—5 of FIG. 2, and FIG. 6 is an enlarged fragmentary section taken along line 6—6 of FIG. 5.

Referring first to FIG. 1, a conventional double reduction planetary torque multiplier 10, such as of the type marketed by B. K. Sweeney Mfg. Co. of Denver, Colorado, under Model No. 105-10, is shown having a housing 12 in which a gear train, not shown, is enclosed for multiplying the torque applied to the torque multiplier at an input drive end 14 to obtain a larger torque at the driven output end 16. A reaction handle 18 extends normally away from the housing 12 and is adapted to be abutted against a stationary object to take up torque reaction while the torque multiplier is operating on a nut, bolt, cap screw or other part requiring rotary force. The input drive end 14 of the torque multiplier 10 has a female socket, not shown, adapted for reception of the drive shaft of a driving tool 20, shown in phantom lines in FIG. 1, and the output driven end 16 of the torque multiplier has a female socket 22 for reception of the output drive shaft assembly 24, of the present invention.

As best shown in FIGS. 4 through 6, the socket 22 in the output driven end 16 of the torque multiplier 10 is elongated with a square transverse cross-section and opens through the output end of the torque multiplier. The innermost or trailing end of the socket has a rearwardly directed frusto-conical portion 26 adapted to receive a plug or seal member 28 which prevents leakage of lubricating grease from the gear housing through a passage 30 which communicates with the socket 22. The seal member 28, of course, also prevents the ingress of dirt or other abrasive particles into the gear housing 12. Adjacent the frustoconical portion 26, a cylindrical cavity or recess 32, which is coaxial with the central longitudinal axis of the socket 22, is provided in the wall of the socket 22 and has a diameter greater than the width of the socket but slightly less than or approximately equal to the diagonal measurement of the socket. This cavity establishes four arcuate retention shoulders 34 disposed 90° apart which serve to retain the output shaft assembly 24 in the socket 22, in a manner to be described later. A counterbore 36, also coaxial with the central longitudinal axis of the socket 22 and of approximately the same diameter as the cylindrical cavity 32, is provided in the output driven end of the torque multiplier for a reason which will become more clear with the description hereinafter.

Referring now particularly to the output shaft assembly 24, it is seen best in FIGS. 1, 4 and 5 to include an elongated body member 38 of square transverse cross-section which is slightly smaller than the cross-sectional area of the socket 22 so that it is easily slid into or out of the socket but so that it mates with the socket and is, therefore, driven rotatably by the output end 16 of the torque multiplier when in operation. At the approximate longitudinal center of the body member 38 or slightly forwardly thereof, a transverse cylindrical bore 40 is provided through the body member so as to be normal to opposite faces of the body member.

The transverse cylindrical bore 40 passes through an axial bore 42 in the body member which extends approximately two-thirds of the length of the body member along the central longitudinal axis of the body member and opens through the trailing end 44 of the body member. The axial bore 42 is adapted to rotatably receive a cylindrical core rod 46 which extends rearwardly from the trailing end 44 of the body member and has transverse passages 48 and 50 therethrough adjacent its leading and trailing ends 52 and 54 respectively. The transverse passage 48 in the leading end 52 of the core rod 46 is adapted to be aligned with the transverse bore 40 through the body member so as to tightly receive an alignment pin 56, disclosed in the form of a roll pin of C-shaped cross-section, which serves to secure the body member of the output shaft assembly to the core rod to prevent relatively axial and rotative movement between the body member and the core rod. The transverse passage 50 through the trailing end 54 of the core rod receives an anchor pin 58, also disclosed as being of the roll pin type having a C-shaped cross-section, which extends normally away from the core rod with its outer end spaced slightly inwardly from the circumferential wall of the cylindrical cavity 32 in the driven portion of the torque multiplier.

As can be appreciated by reference to FIG. 6, the core rod 46 is rotatable within the body member 38 when it is not secured thereto by the alignment pin 56 so that the anchor pin 58 can be moved between an anchoring position underlying one of the arcuate retention shoulders 34 and a position wherein it is in alignment with a diagonal of the socket 22 so that the core rod along with the anchor pin can be moved axially of the socket and thereby removed therefrom. As will be appreciated, however, the transverse passages 48 and 50 through the core rod 46 are parallel so that when the alignment pin 56 is inserted through the body member and the transverse passage 48 in the leading end of the core rod, the anchor pin 58 is fixed in its anchoring position so that the entire output shaft assembly is retained in the socket in the driven portion of the torque multiplier.

Spaced rearwardly from the transverse bore 40 through the body member and in alignment with the counterbore 36 in the output end of the torque multiplier when the output shaft assembly is positioned in the torque multiplier, is a narrow outwardly opening peripheral groove 60 in the body member which establishes a thin section of the body portion of reduced cross-sectional area which defines a shear plane. The depth of the peripheral groove 60 is predetermined so that the body portion of the output shaft will shear along the shear plane when a predetermined torque load is applied to the output shaft. When this predetermined torque load or a greater torque load is applied, the body portion of the output shaft will shear into leading and trailing segments, with the trailing segment continuing to rotate while the leading segment remains stationary. Of course, in this condition, the trailing segment of the body member will rotate freely about the core rod 46 thereby avoiding damage to the internal gears of the torque multiplier.

Forwardly of the transverse bore 40 through the body member of the output shaft assembly is a transverse cylindrical recess 62 seating a conventional ball-detent type of snap lock assembly 64 which is commonly used to releasably retain a female socket member 66, FIG. 1, on the leading end of the output drive shaft assembly. end of the output drive shaft assembly.

If the output shaft assembly of the present invention is sheared during a rotary operation, as mentioned previously, the body member 38 of the drive shaft will separate into leading the trailing segments which are freely rotatable relative to each other. The output shaft assembly, of course, then becomes inoperable for imparting rotary force to the socket member 66 so the output shaft must be replaced with an undamaged output shaft. To remove the severed shaft, the alignment pin 56 is first removed so that the leading segment of the body member can be slid axially and thereby removed from the core rod 46 leaving only the trailing segment of the body member, the core rod and the anchor pin 58 in the torque multiplier. When the leading segment of the body member is removed, the leading end of the core rod is exposed so that it can be manually rotated until the anchor pin is moved to its removal phantom line position of FIG. 6 in alignment with a diagonal of the socket 22 whereupon the remaining portion of the output shaft assembly can be slid axially out of the socket leaving the socket free to receive a new output shaft assembly.

Mounting the output shaft assembly in the torque multiplier is also a very simple procedure and can be done by first inserting the core rod 46 with the anchor pin 58 into the socket 22 and rotating the core rod so that the anchor pin underlies one of the arcuate shoulders 34 in the socket, then placing the body member 38 of the output shaft assembly onto the core rod so that the transverse bore 40 through the body member is aligned with the passage 48 in the leading end of the core rod, and finally inserting the alignment pin 56 through the transverse bore 40 and the transverse passage 48 to secure the body member to the core rod.

It will be appreciated that the aforedescribed output shaft assembly has been designed to shear under a predetermined torque load so as to avoid damage to the gear components of the torque multiplier and so that the entire output shaft assembly can be easily and quickly replaced even though the body member of the output shaft has been separated into two segments, one of which is completely received within the socket portion 22 of the torque multiplier. While the invention has been described with the a certain degree of particularity, it is understood that the present disclosure has been made by way of example and that changes in details of structure may be made without departing from the spirit thereof.

What is claimed is:

1. An output shaft assembly for a tool having a rotatably driven portion with a socket in said rotatably driven portion for reception of the output shaft assembly comprising:
    a body member received in said socket so as to protrude outwardly therefrom, said body member having a section of reduced cross-sectional area,
    means operatively interconnecting the rotatably driven portion of the tool with the body member to impart unitary rotational motion to the body member,
    selectively releasable retention means retaining the body member in said socket whereby when said body member is severed along said section of reduced cross-sectional area, the body member will remain in the socket until the retention means is released allowing the assembly to be removed from the socket, and
    means for selectively anchoring said retention means in said socket.

2. An output shaft assembly for a tool having a rotatably driven portion with a socket of non-circular cross-section opening through a face of said rotatably driven portion and a recess in the wall of the socket wherein said recess is spaced from said face, comprising:
    an elongated body member of non-circular cross-sectional configuration conforming to that of the socket, said body member being seated in the socket for unitary rotation with the rotatably driven portion, said body member having a leading end protruding forwardly from said face and a trailing end within said socket, a section of reduced cross-sectional area between said leading and trailing ends, and a central axial cylindrical bore opening through the trailing end of the body member, and
    retention means including a cylindrical rod seated in said cylindrical bore so as to protrude rearwardly from the trailing end of the body member, means for releasably retaining said rod in the cylindrical bore, and a lateral extension from said rod rearwardly of the trailing end of the body, said extension being selectively received in said recess in the wall of the socket to selectively retain the assembly in the socket.

3. The output shaft assembly of claim 2 wherein said reduced cross-sectional area section of the body member is defined by a peripheral groove in the outer surface of the body member, said groove lying in a plane which is normal to the longitudinal axis of the body member.

4. The output shaft assembly of claim 2 wherein said body member has a transverse passage therethrough and said rod has a transverse passage therethrough alignable with said transverse passage through the body member and wherein said means for releasably retaining said rod in the cylindrical bore comprises a removable pin member tightly received in said transverse passages through the body member and rod.

5. The output shaft assembly of claim 4 wherein said transverse passage through the body member is situated between the leading end of the body member and the reduced cross-sectional area of the body member.

6. The output shaft assembly of claim 2 wherein said rod has a second transverse passage therethrough rearwardly of the trailing end of the body member and wherein said lateral extension comprises a removable pin member tightly received in said second transverse passage so as to extend normally away from said rod.

7. The output shaft assembly of claim 6 wherein said socket is of square cross-section and said recess in the socket wall is of generally circular cross-section and has a diameter substantially equal to a diagonal of the socket, and wherein said lateral extension pin extends laterally away from said rod a distance greater than half the width of the socket and less than half the diameter of the recess whereby the shaft assembly will be retained in the socket by the lateral extension pin when the lateral extension pin is not aligned with a diagonal of the socket but can be removed from the socket when the lateral extension pin is aligned with a diagonal of the socket.

8. The output shaft assembly of claim 5, further including a ball-detent type snap lock assembly in the body portion forwardly of the transverse passage through the body member to releasably retain a female socket member on the leading end of the shaft assembly.

9. The output shaft assembly of claim 3 wherein said reduced cross-sectional area section of the body member is situated forwardly of the socket in the rotatably driven portion of the tool.

10. An output shaft assembly for a torque multiplier having a rotatably driven portion with a socket of square cross-section opening through a face of the rotatably driven portion and a recess of circular cross-section in the wall of the socket wherein said recess is spaced from said face, comprising:
    an elongated body member of square cross-section seated in the socket for unitary rotation with the rotatably driven portion, said body member having a leading end protruding normally away from said face, a trailing end within said socket, a peripheral groove in the outer surface of the body member lying in a plane normal to the longitudinal axis of the body member, a central axial cylindrical bore opening through the trailing end of the body member and extending forwardly of the plane of the peripheral groove, a transverse bore forwardly of the plane of the peripheral groove extending through the axial bore, and a ball-detent snap lock assembly in one side of the body member adapted to releasably retain a female socket member on the leading end of the body member, an elongated cylindrical rod inserted in said cylindrical bore so as to protrude rearwardly from the trailing end of the body member, said rod having leading and trailing ends with parallel transverse passages through the leading and trailing ends, said transverse passage through the trailing end of the rod being rearwardly of the trailing end of the body member and in alignment with the recess in the socket wall and said transverse passage through the leading end of the rod being alignable with the transverse bore through the body member, an alignment pin releasably inserted through the transverse bore in the body member and the transverse passage through the leading end of the rod to retain the body member on the rod, and an anchor pin inserted in the transverse passage through the trailing end of the rod, said anchor pin protruding away from the rod a distance greater than half the width of the socket but less than half the diameter of the recess so that when the anchor pin is not aligned with a diagonal of the socket it will extend into the recess in the socket wall to retain the shaft assembly in the socket but when it is aligned with a diagonal of the socket the entire shaft assembly can be slid out of the socket.

* * * * *

UNITED STATES PATENT OFFICE
CERTIFICATE OF CORRECTION

Patent No. 3,830,119　　　　　　　　　Dated August 8, 1973

Inventor(s) Leo V. Travis

It is certified that error appears in the above-identified patent and that said Letters Patent are hereby corrected as shown below:

Column 1, line 9 "oter" should read ---other---.

Column 3, line 12 "frustoconical" should read ---frusto-conical---.

Column 4, line 41 delete "end of the output drive shaft assembly."

Signed and sealed this 18th day of February 1975.

(SEAL)
Attest:

RUTH C. MASON
Attesting Officer

C. MARSHALL DANN
Commissioner of Patents
and Trademarks